United States Patent
Jager et al.

[11] Patent Number: 5,888,569
[45] Date of Patent: Mar. 30, 1999

[54] PROCESS FOR PRESERVING LIQUID AND PASTY FEEDSTUFFS

[75] Inventors: Martin Jager, Offenheim; Karlheinz Remmert, Hofheim, both of Germany

[73] Assignee: Hoechst Aktiengesellschaft, Germany

[21] Appl. No.: 528,815

[22] Filed: Sep. 15, 1995

[30] Foreign Application Priority Data

Sep. 19, 1994 [DE] Germany .......................... 44 33 293.9
Mar. 21, 1995 [DE] Germany ........................ 195 10 158.8

[51] Int. Cl.$^6$ .............................. A23B 7/154; A23B 9/26; A23K 3/03; A23K 3/04
[52] U.S. Cl. .................... 426/331; 426/335; 426/532; 426/623; 426/624; 426/635; 426/637
[58] Field of Search ..................... 426/321, 635, 426/637, 331, 623, 624, 636, 335, 532

[56] References Cited

U.S. PATENT DOCUMENTS

| | | | |
|---|---|---|---|
| 4,212,894 | 7/1980 | Franzen, Jr. et al. ................. | 426/332 |
| 4,342,789 | 8/1982 | Ulvo et al. ............................ | 426/332 |
| 4,592,915 | 6/1986 | Goyette et al. . | |

FOREIGN PATENT DOCUMENTS

| | | |
|---|---|---|
| 275 958 | 1/1988 | European Pat. Off. . |
| 259 824 | 3/1988 | European Pat. Off. . |
| 34 12 083 | 10/1985 | Germany . |

*Primary Examiner*—Arthur L. Corbin
*Attorney, Agent, or Firm*—Connolly & Hutz

[57] ABSTRACT

The invention relates to a process for preserving liquid and pasty feedstuffs made from potatoes, food residues, spent grains, brewer's yeast, distiller's spent mash and similar constituents, which comprises adding an aqueous potassium sorbate solution and an aqueous solution of a physiologically harmless acid, to the feedstuff using intensive mixers, and the feedstuffs preserved in this manner.

12 Claims, No Drawings

PROCESS FOR PRESERVING LIQUID AND PASTY FEEDSTUFFS

The invention relates to a process for preserving foodstuffs or residues from the food industry which are used alone or in a mixture with feed grains or other feedstuffs as animal feed, and feedstuffs preserved in this manner.

Potato wastes, food wastes and residues from the food industry such as brewer's grains, brewer's yeast and distiller's spent mash contain nutritionally valuable constituents. For this reason they have long been used as animal feed either as a single product or in a mixture with feed grains or other feedstuffs.

However, because of the high water content of the above-mentioned products, these are subject to rapid microbial decay. Although the water content can be partially decreased by intensive pressing, the water content is still sufficient, however, when fed both alone and in a mixture with other feedstuffs to cause growth of micro-organisms. This applies very particularly to the relatively high pH range which the food industry wastes usually exhibit.

The problem of utilization of food wastes as animal feed is made greater still by the fact that these products do not always arise continuously but in relatively large amounts during a production campaign.

Although there is the possibility of passing the products in question, immediately after their production, onto the farmers and feeding the products directly to animals, such a utilization is restricted in time to the production campaign and is only useful in the immediate vicinity of the corresponding food factories.

For longer utilization of food wastes which arise hot, attempts are being made to deliver these in insulated containers to animal producers. However, this process requires considerable care and is uneconomic from the aspect of the costs of the insulated containers.

Because of these difficulties, attempts have also been made to preserve the food wastes chemically, namely to increase the storage life by addition of so-called preservatives. These preservatives must be physiologically harmless, compatible with the animal, approved by feed legislation, odor neutral and taste neutral, not vaporizing or volatilizing at 60°–80° C., inexpensive and highly effective against spoilage organisms.

The ideal solution would be a chemical preservation of potato wastes, food wastes and wastes from the food industry which enables open storage of the products alone or in a mixture with feed grains or other feedstuffs for at least a few weeks.

The closest approach to this ideal is given by sorbic acid which, because of its high activity against molds is highly suitable for preserving many feedstuffs. Nevertheless, in the case of waste products, sorbic acid has only a restricted utility. This is due to the occasionally high pH of the products and high subsequent infections during distribution, further processing and during the feeding period for the products in question.

The general prior art with respect to the preservation of liquid or pasty feedstuffs by chemical preservatives is described in Patent Application DP 34 12 083. Although the procedure described in the context of this patent (dry mixing of pulverulent sorbic acid) does permit preservation of the said products, that is only for up to a week, with the use of relatively high preservative concentrations so that the process is uneconomic.

In view of the constantly increasing landfill costs for unutilizable residues from the food industry, there is a considerable demand for a process which avoids the disadvantages described and enables these residues to be preserved simply and economically and thus permits long-term utilization as animal feed of these highly perishable residues.

This object is achieved by a process for preserving liquid and pasty feedstuffs made from potatoes, food residues, spent grains, brewer's yeast, distiller's spent mash and similar constituents, which comprises adding an aqueous potassium sorbate solution and an aqueous solution of a physiologically harmless acid, spatially or temporally separately, to these products using intensive mixers.

The spatial separation is possible by using an intensive mixer having two compartments. With temporally sequential addition of firstly potassium sorbate and secondly a physiologically harmless acid, a single-compartment intensive mixer can also be used.

The process according to the invention permits the fine and accurately-dosed introduction both of the potassium sorbate solution and also of the physiologically harmless acid into the spent grains. This is achieved successfully using intensive mixers such as plough share mixers or paddle mixers, e.g. the Pegasus type from the Dinnissen company, Sevenum/Netherlands. Corresponding examples are summarized below. A Pegasus paddle mixer which is usually constructed as a single-chamber system must be converted into a two-chamber system for the simultaneous, but spatially separated, introduction of potassium sorbate and a physiologically harmless acid. This is achieved by incorporating a partition above the mixer axes. The mixer can be operated both continuously and discontinuously. In both the continuous and the discontinuous procedure it is necessary to add the potassium sorbate solution before the acid, since the other way round, precipitation of sorbic acid is to be expected. Both potassium sorbate and the acid are introduced in aqueous form via a nozzle which sprays the aqueous solutions into the fluidized zone of the material to be mixed. Mixing of the solutions sprayed in must be prevented at all events, since otherwise water-insoluble sorbic acid is formed.

The additional introduction of a physiologically harmless acid decreases the pH and increases the activity of the potassium sorbate which leads to a cost saving (use of smaller amounts of potassium sorbate).

Physiologically harmless acids which are suitable are, e.g., phosphoric acid, hydrochloric acid, sulfuric acid, fumaric acid, lactic acid, propionic acid and tartaric acid. In many cases, phosphoric acid has proved to be useful, which is also advantageous for cost reasons.

It has proved to be expedient to use a 20 to 60% strength, in particular 30 to 50% strength, potassium sorbate solution; the phosphoric acid used can be employed at a concentration of 40 to 89, a concentration of 70 to 80% by weight being advantageous.

Very good preservation results are achieved if 0.05 to 1, in particular 0.08 to 0.8, % by weight, preferably 0.1 to 0.6, % by weight, of potassium sorbate (100% pure) is used, based on unpreserved feedstuff.

It is advantageous to use the physiologically harmless acid in a concentration of 0.05 to 1, in particular 0.1 to 0.8, preferably 0.2 to 0.6, % by weight, based on unpreserved feedstuff.

The process according to the invention has considerable advantages in comparison to DE 34 12 083, e.g.
  marked prolongation of the storage life of the preserved materials
  lower concentrations of sorbic acid or potassium sorbate
  simpler technical procedure.

The process is very high suitable for preserving spent grains which, owing to a special production process (pressing the mash with filter presses, e.g. type Meura 2001), contain less carbohydrate than wet grains which arise by a conventional process. The use of such a technology increases the beer yield by approximately 8–12%. Because of the lack of carbohydrates, however, in contrast to conventional wet grains, spent grains can no longer be ensiled using lactic acid bacteria and thus made storable for a longer period. For this reason, precisely for spent grains, there is a considerable requirement for a stabilization or preservation process. Unpreserved spent grains, depending on the temperature and microbial load, spoil within 2–3 days, so that transport of this product and use as feed is a considerable logistical problem both for the breweries and also the farmer.

By using the process according to the invention, storage lives of 2 to 3 weeks and more can be achieved for such spent grains.

The invention further relates to liquid and pasty feedstuffs made from potatoes, food residues, spent grains, brewer's yeast, distiller's spent mash and similar constituents, to which have been added an aqueous potassium sorbate solution and an aqueous solution of a physiologically harmless acid, spatially or temporally separately, using intensive mixers.

Of importance in this context are, for example, feedstuffs which contain, as physiologically harmless acid, phosphoric acid, hydrochloric acid, sulfuric acid, fumaric acid, lactic acid, propionic acid or tartaric acid, in particular phosphoric acid.

Feedstuffs of particular interest are those which contain 0.05 to 1, in particular 0.08 to 0.8, preferably 0.1 to 0.6, % by weight of potassium sorbate (100% pure) and 0.05 to 1, in particular 0.1 to 0.8, preferably 0.2 to 0.6, % by weight of the physiologically harmless acid.

Feedstuffs of practical importance are those which are produced by the process described using 20 to 60% strength, in particular 30 to 50% strength, potassium sorbate solution and 40 to 89% strength, in particular 70 to 80% strength, phosphoric acid. Feedstuffs which comprise spent grains are highly important.

The feed value of the spent grains is just as little influenced by potassium sorbate as are other parameters relative to feeding. Thus, the preservation process described has only an extremely slight influence on analytically and nutritionally relevant parameters of the spent grains. As a result of the introduction of extremely small amounts of liquid, the dry matter is not significantly influenced. The pH is decreased by approximately 1–1.5 pH units, while the preservation, as would be expected, leads to no increase in the carbohydrate content. Other parameters such as organic matter, crude protein, crude fiber, crude fat and nitrogen-free extract are likewise not significantly influenced (see Table 1).

TABLE 1

Influence of preservation on analytically relevant parameters

|  | Fresh | Preserved (e.g. 0.2% potassium sorbate + 0.4% phosphoric acid) |
|---|---|---|
| Dry matter | 31.7% | 31.7% |
| pH | 5.0–5.2 | 3.7–4.0 |
| Carbohydrates | <0.5% | <0.5% |
| Organic matter | 63 | 63 |
| Crude protein | 83 | 79 |
| Crude fiber | 42 | 36 |
| Crude fat | 88 | 85 |
| N-free extract | 54 | 56 |

On the basis of a feed trial on sheep, it could be demonstrated that the preservation with potassium sorbate and phosphoric acid had no influence on the apparent digestibility of spent grains. Preserved spent grains, at 63%, have a comparable digestibility to that of fresh wet grains. In contrast thereto, ensiled wet grains, at 58%, as would be expected, have a lower apparent digestibility. This decrease in apparent digestibility is due to ensiling losses. Such losses do not occur in preserved spent grains. The feed value of the protein-rich byproduct spent grains (26% nitrogen-containing compounds in dry matter) is also only slightly influenced over the course of storage of approximately 3 weeks. At the beginning of the test the feed value was 6.6 MJ/kg, while after storage for three weeks (without covering) the feed value was 6.4 MJ/kg.

The feedstuff according to the invention neither needs to be ensiled, nor covered nor processed in any other manner by the farmer. Open storage subjected to the weather is equally possible. This represents for the farmer a considerable easing in work in comparison to the ensilation of conventional brewer's grains.

By means of the novel preservation process and feedstuffs, the breweries' problem of disposing of spent grains is solved, as is the farmer's problem of stability of the spent grains during feeding.

In comparison with a procedure which is likewise used to stabilize spent grains and based on a starch and lactic acid microorganism suspension, the novel preservation process has considerable advantages. These are:

ensiling is no longer required (saving in work, cost savings)

no ensiling losses no environmental pollution due to efflux of ensiling liquid cost savings due to improved logistics.

The following examples are intended to describe the process without restricting it thereto.

EXAMPLE 1

After filling a Pegasus paddle mixer with spent grains, potassium sorbate solution (50%) and phosphoric acid solution (75%) are sprayed at a pressure of approximately 3 bar onto the fluidized zone of the material to be mixed.

Dosages
1. 0.1% potassium sorbate+0.1% phosphoric acid (mixing time in total 60 seconds)
2. 0.1% potassium sorbate+0.4% phosphoric acid (mixing time in total 100 seconds)
3. 0.2% potassium sorbate+0.2% phosphoric acid (mixing time in total 80 seconds)
4. 0.05% potassium sorbate+0.4% phosphoric acid (mixing time in total 90 seconds).

Results

| Sample number | Water content (1 hour drying lamp 160 V) (%) | pH (2 g in 10 ml of distilled water) | Potassium sorbate content (%) | | Storage life in days |
|---|---|---|---|---|---|
| | | | Theoretical | Actual | |
| C 1 | 73.6 | 3.74 | — | — | 3 |
| C 2 | 74.2 | 3.87 | — | — | 1 |
| 1 A | 73.3 | 3.77 | 0.1 | 0.11 | |
| 1 B | 73.0 | 3.77 | 0.1 | 0.12 | 13 |
| 1 C | 74.4 | 3.79 | 0.1 | 0.11 | |
| 2 A | 73.9 | 3.53 | 0.1 | 0.1 | |
| 2 B | 73.7 | 3.55 | 0.1 | 0.1 | 13 |
| 2 C | not determined | 3.56 | 0.1 | 0.12 | |
| 3 A | not determined | 3.81 | 0.2 | 0.21 | |
| 3 B | not determined | 3.82 | 0.2 | 0.22 | 25 |
| 3 C | not determined | 3.81 | 0.2 | 0.22 | |

-continued

Results

| Sample number | Water content (1 hour drying lamp 160 V) (%) | pH (2 g in 10 ml of distilled water) | Potassium sorbate content (%) Theoretical | Potassium sorbate content (%) Actual | Storage life in days |
| --- | --- | --- | --- | --- | --- |
| 4 A | not determined | 3.58 | 0.05 | 0.07 | |
| 4 B | not determined | 3.58 | 0.05 | 0.07 | 7 |
| 4 C | not determined | 3.57 | 0.05 | 0.07 | |

C = Control
1.–4. see under "Dosages"

EXAMPLE 2

1. Dosing Apparatuses

One Mohno pump each for aqueous potassium sorbate solution or orthophosphoric acid (potassium sorbate does not dissolve in phosphoric acid, so that the separate dosing of the liquids is absolutely necessary). Continuous ploughshare mixer having 2 separate feed pipes optionally without or with a single-component nozzle.

2. Dosage

| | per 35 kg of brewer's grains (ml) | per 1000 kg of brewer's grains/h (l) |
| --- | --- | --- |
| Orthophosphoric acid 75% strength | 44 | 1.26 |
| Potassium sorbate solution 40% strength | 245 | 7.00 |
| | 370 | 10.57 |
| | 490 | 14.00 |

Results

| Sample No. | $H_3PO_4$ 75% strength ml | Potassium sorbate solution 40% strength ml | Mixing time minutes | Dry matter % | pH | Sorbic acid content % |
| --- | --- | --- | --- | --- | --- | --- |
| 101 | 0 | 0 | 0 | 24.9 | 5.1 | 0 |
| 231 | 44 | 0 | 6 | 26.4 | 4.7 | 0 |
| 232 | 44 | 0 | 6 | 26.2 | 4.7 | 0 |
| 233 | 44 | 0 | 6 | 25.4 | 4.8 | 0 |
| 311 | 44 | 245 | 1.5 | 26.4 | 5.1 | 0.18 |
| 312 | 44 | 245 | 1.5 | 26.2 | 5.1 | 0.18 |
| 313 | 44 | 245 | 1.5 | 26.1 | 5.1 | 0.18 |
| 321 | 44 | 245 | 3 | 26.5 | 5 | 0.18 |
| 322 | 44 | 245 | 3 | 27.4 | 5 | 0.18 |
| 323 | 44 | 245 | 3 | 26.9 | 5.1 | 0.17 |
| 331 | 44 | 245 | 6 | 26.9 | 5 | 0.19 |
| 332 | 44 | 245 | 6 | 27.2 | 4.8 | 0.19 |
| 333 | 44 | 245 | 6 | 26.6 | 5 | 0.18 |
| 411 | 44 | 370 | 1.5 | 26.1 | 5 | 0.29 |
| 412 | 44 | 370 | 1.5 | 26.7 | 5 | 0.27 |
| 413 | 44 | 370 | 1.5 | 26.0 | 5 | 0.28 |
| 421 | 44 | 370 | 3 | 26.0 | 5 | 0.28 |
| 422 | 44 | 370 | 3 | 25.9 | 5 | 0.29 |
| 423 | 44 | 370 | 3 | 26.6 | 5 | 0.28 |
| 431 | 44 | 370 | 6 | 27.2 | 5 | 0.27 |
| 432 | 44 | 370 | 6 | 25.5 | 4.9 | 0.29 |
| 433 | 44 | 370 | 6 | 26.0 | 5 | 0.28 |
| 511 | 44 | 490 | 1.5 | 26.9 | 5.2 | 0.36 |
| 512 | 44 | 490 | 1.5 | 26.4 | 5.1 | 0.34 |
| 513 | 44 | 490 | 1.5 | 26.6 | 5.1 | 0.37 |
| 521 | 44 | 490 | 3 | 25.8 | 5.1 | 0.35 |
| 522 | 44 | 490 | 3 | 25.9 | 5 | 0.34 |
| 523 | 44 | 490 | 3 | 26.8 | 5.1 | 0.36 |
| 531 | 44 | 490 | 6 | 25.9 | 5 | 0.36 |
| 532 | 44 | 490 | 6 | 26.0 | 5 | 0.37 |
| 533 | 44 | 490 | 6 | 25.5 | 5.1 | 0.37 |

We claim:

1. A process for preserving liquid and pasty feedstuffs, which comprises the steps of:

providing a liquid or pasty feedstuff in an intensive mixer, adding to the liquid or pasty feedstuff an aqueous potassium sorbate solution, and adding to the liquid or pasty feedstuff an aqueous solution of physiologically harmless acid, wherein the aqueous potassium sorbate solution and the aqueous acid solution are added at different locations or times via a nozzle which sprays the aqueous solutions into a fluidized zone of the liquid or pasty feedstuff with in the intensive mixer.

2. The process as claimed in claim 1, wherein the physiologically harmless acid used is an acid selected from the group consisting of phosphoric acid, hydrochloric acid, sulfuric acid, fumaric acid, lactic acid, propionic acid and tartaric acid.

3. The process as claimed in claim 1, wherein the potassium sorbate solution used is 20 to 60% strength.

4. The process as claimed in claim 1, wherein the physiologically harmless acid used is phosphoric acid at a concentration of 40 to 89% by weight.

5. The process as claimed in claim 1, wherein 0.05 to 1% by weight of potassium sorbate is used, based on unpreserved feedstuff.

6. The process as claimed in claim 1, wherein 0.05 to 1% by weight of the physiologically harmless acid is used, based on unpreserved feedstuff.

7. The process as claimed in claim 1
wherein the feedstuff used is spent grains which are obtained by pressing the mash with filter presses.

8. A process as claimed in claim 1, wherein the acid is phosphoric acid.

9. The process as claimed in claim 1, wherein the potassium sorbate solution is 30 to 50% strength.

10. The process as claimed in claim 1, wherein the acid is 70 to 80% concentrated phosphoric acid.

11. The process as claimed in claim 1, wherein 0.1 to 0.6% by weight of potassium sorbate is used, based on unpreserved feedstuff.

12. The process as claimed in claim 1, wherein 0.2 to 6% by weight of acid is used, based on the unpreserved feedstuff.

* * * * *